United States Patent [19]

Neithardt, Jr.

[11] 4,100,329
[45] Jul. 11, 1978

[54] DRAFTING FILM

[75] Inventor: William A. Neithardt, Jr., Ridgefield, N.J.

[73] Assignee: Keuffel & Esser Company, Morristown, N.J.

[21] Appl. No.: 657,521

[22] Filed: Feb. 12, 1976

[51] Int. Cl.$^2$ .............................................. B32B 27/38
[52] U.S. Cl. ..................................... 428/413; 428/419; 428/448; 428/451; 428/480; 428/482; 428/520; 428/913; 427/54; 427/331; 204/159.14
[58] Field of Search ................... 427/54, 331; 428/411, 428/413, 419, 480, 482, 451, 448, 913, 414, 415, 520; 204/159.14, 159.19

[56] References Cited

U.S. PATENT DOCUMENTS

| | | | |
|---|---|---|---|
| 2,999,016 | 9/1961 | Beeber et al. | 96/75 |
| 3,051,591 | 8/1962 | Sites et al. | 427/54 |
| 3,100,722 | 8/1963 | Herrmann | 428/482 X |
| 3,700,574 | 10/1972 | Kehr et al. | 427/44 X |
| 3,898,349 | 8/1975 | Kehr et al. | 427/54 X |
| 3,908,039 | 9/1975 | Guthrie et al. | 427/54 |
| 3,925,349 | 12/1975 | Gaske | 427/54 X |
| 3,984,297 | 10/1976 | Morgan | 427/54 |

Primary Examiner—P. C. Ives
Attorney, Agent, or Firm—Lionel N. White

[57] ABSTRACT

Sheet material useful in the preparation of draftsmen's and engineers' plans and drawings comprises a base support, preferably of a stable polyester film, bearing a translucent pencil- and ink-receptive coating comprising finely-divided silica pigment dispersed throughout a binder matrix which is essentially a cross-polymerized reaction product of a mixture of a relatively low molecular weight acrylic or methacrylic ester vinyl monomer, a drying oil acrylate, and a blend of polyene and polythiol radiation curable polymers. The coating composition is substantially devoid of volatile solvent vehicle, yet is readily set to a functional drafting surface by exposure to actinic radiation, such as ultraviolet light.

6 Claims, No Drawings

DRAFTING FILM

BACKGROUND

In view of their exceptional stability, resistance to abrasion and extensive handling stresses, and stability under varying atmospheric conditions, polyester film based drafting sheet material has found extensive acceptance in the field of technical and engineering drawing.

Such drafting films consist essentially of a substantially transparent film of a polyester, such as polyethylene terephthalate, having a coating thereon of an adherent matrix of polymeric composition having dispersed throughout its thickness sufficient finely-divided pigment to impart a surface quality of ink- and pencil-receptiveness, as well as to yield a sufficient opacity or translucency to accord acceptable legibility during use.

The manufacture of such drafting film products has hitherto entailed the application by suitable coating means of a uniform layer of a fluid composition comprising a dispersion or slurry of pigment in a vehicle comprising a solution, most often in organic solvent, of selected polymeric compounds or blends thereof. Subsequent to such application of coating composition, circulating heated air has been utilized to remove the volatile solvents as vapor, resulting in solidification of the coated layer as a pigmented film adherent to the polyester base. Representative of such earlier drafting film products and the coating procedures involved in their manufacture are those discussed in U.S. Pat. Nos. 2,999,016 and 3,100,722.

Attendant to the manufacture of drafting film material by means utilizing volatile vehicle coating technology has been the uneconomical and, when utilizing organic solvent, dangerous drying procedures, and more recently the obtrusive problem of unrecovered vapor wastes disposal. Manufacture of the earlier products has also suffered from limitations dictated by the susceptibility of base sheet or coating composition to otherwise effective processing conditions such as drying temperature, massive air volume handling, and the like.

SUMMARY

The disadvantages of manufacturing drafting film products based primarily upon the use of pigment dispersions in volatile solvent vehicle compositions are, for the most part, obviated in the present invention which consists essentially of the use, in lieu of volatile vehicles, of monomeric and polymeric compounds which are normally fluid and of coatable consistency, yet are capable of copolymerizing or cross-linking upon exposure to actinic radiation, such as ultraviolet light, to yield strong yet flexible films which serve well as binder matrices for finely-divided pigments to yield drawing-receptive surfaces in drafting film products. Thus, through the use of such cured-coating techniques a variety of useful drafting film materials may be readily and economically manufactured without concern for extensive drying and atmospheric waste recovery equipment.

As base sheet material for drafting films according to the present invention there may be employed the usual papers and films more commonly used in vellum or drafting media production, preference being had, however, for polyester films, and particularly the biaxially-oriented heat-stabilized polyethylene terephthalate films which have been found to exhibit exceptional heat- and hygroscopic-stability. Such base materials may range in thickness from about 50–250μm and will normally exhibit the significant degree of actinic transparency usually associated with this class of drafting media which is normally utilized in diascopic reproduction and copying. As in the production of earlier drafting materials, film bases, such as the polyesters, which exhibit a notable resistance to the application of surface coatings may be pre-treated by known means including electronic or corona discharge, and the application of pre-coat or surface treatment compositions.

The actual manufacture of these new drafting films is relatively straight-forward and entails merely the application of a desired thickness of coating composition, as will be more fully described, to a selected base sheet or film followed by exposure of the coated composition to actinic radiation, notably ultraviolet light, for a time sufficient to effect cross- or inter-polymerization of the binder matrix of the coated composition. The usual converting operations may thereafter be employed to ready the product for ultimate consumption by the draftsman or engineer.

The coating compositions utilized in the preparation of the present drafting film product are prepared by dispersing one or more finely-divided pigments by stirring, ball-milling, or other comminuting means throughout a volume of a fluid blend of normally liquid polymerizable or cross-linking monomeric and polymeric compounds. Such a blend of compounds provides the vehicle of coatable consistency for the pigment dispersion without need of resort to volatile solvents and comprises a mixture of polymerizable materials from three types which in common are significantly responsive in their initial and accelerated polymerization and cross-linking reactions under the influence of actinic radiation, such as ultraviolet light.

The polymerizable materials utilized in the preparation of the coating composition vehicle are selected from among (1) polyene/polythiol compound blends, (2) epoxidized drying oil acrylates, and (3) acrylic ester vinyl monomers. A composition may further include adjuncts such as cure-accelerating photosensitizers, polymerization inhibitors and stabilizers, surfactants, and the like.

The polyene/polythiol mixture component of the present coating composition is of the type described in U.S. Pat. No. 3,700,574 and commercially available from a number of sources. Particularly useful are the Radiation Curable Polymers of W. R. Grace & Co., notably those marketed under the trade designation RCP 411D, RCP 611U, and RCP 5961B. About 5% to 20% by weight of a commercial polyene/polythiol blend product serves well in a coating composition of the present invention.

Although available polyene/polythiol materials normally include a cure rate accelerator compound in addition to the polymeric reactants, the further addition to a coating composition of up to about 5% of an active photosensitizing compound such as benzophenone, benzoin, diethoxyacetophenone, thioxanthenone, or a benzoin ether proves advantageous and allows the coating production rate to be maintained at practical manufacturing levels. A benzoin isobutyl ether has been found to be particularly useful.

The acrylated oil material employed in the coating composition may be one of the commercially available epoxidized drying oil or semi-drying oil acrylates described in U.S. Pat. No. 3,125,592. Up to about 10% by weight of the acrylated oil component, such as that marketed by Union Carbide Corporation as Actomer X-80, is useful.

The acrylic vinyl monomer derivative serves a dual role in the present coating composition in that, in addition to providing a polyfunctional cross-linking activity, this relatively low molecular weight acrylic or methacrylic acid ester compound acts as an effective diluent for the purpose of maintaining the viscosity of coating composition at a sufficiently low level to allow practical coating rates. Thus, not only is the use of volatile solvent entirely obviated as a means of controlling composition viscosity, but also the polyfunctional character of these monomeric components contributes to their participating in the cross-linking of the final binder matrix of the coated layer. The coating composition may include about 25% to 60% by weight of such useful diluent monomers as trimethylolpropane triacrylate, 1,3-butyleneglycol diacrylate, 1,6-hexanediol diacrylate, neopentylglycol diacrylate, tetraethylene glycol diacrylate, ethylacrylate, 2-ethylhexyl acrylate, trimethylolpropane trimethacrylate and pentaerythritol triacrylate.

As pigment filler which provides both "tooth" and opacity for the ink- and pencil-receptive layer of the final drafting film product there may be employed the usual materials such as titanium dioxide, zinc oxide, aluminum oxide, calcium carbonate, diatomaceous earth, and the like; however, it has been found that an unexpected increase in the rate of curing or cross-linking takes place in the coated composition under exposure to ultraviolet light when the filler is a siliceous pigment. Either crystalline or amorphous silica pigments may be used in this role and about 30% to 50% by weight of such pigments having an average diameter of about 5μm may be included in the coating composition without significantly increasing the viscosity beyond practical levels. By contrast the inclusion of more than about 30% of other commonly used filler pigments results in impractical levels of both such characteristics, that is, coating viscosity and rate of curing. It has been found useful, however, to include up to about 5% by weight of the more opacifying pigments, such as titanium dioxide or zinc oxide, to obtain a desirable level of surface reflectivity or translucency in the final product.

The coating composition generally described above may be applied to the selected support sheet or film in any of the usual coating procedures and commonly used equipment. Provision is made, of course, in such manufacturing facilities to substitute for the common drying ovens or solvent removal operations a source of curing radiation, such as ultraviolet lamps. It has been found that a bank of four mercury lamps having each a rating of 80 watts per centimeter is sufficient to provide adequate curing of a coating of about 10μm thickness at a web speed of about 3,700 meters per hour.

DESCRIPTION

The following examples representing preferred embodiments of coating compositions will serve to provide a more detailed description of the present invention.

EXAMPLE 1

A coating composition was prepared by ball-milling for about 16 hours a dispersion of the following composition. In this and following examples all parts are stated in ratio by weight unless otherwise indicated.

|  | % |
| --- | --- |
| Neopentylglycol diacrylate | 48 |
| Amorphous silica | 40 |
| Polyene/polythiol (W. R. Grace & Co. RCP 5961B) | 9 |
| Epoxidized soybean oil acrylate | 3 |

The fluid composition was applied to a 75μm thick sheet of polyethylene terephthalate film, pre-treated by corona discharge to enhance adhesion, as a uniform wire bar coating of about 15μm thickness. The coated layer was exposed at the rate of about 3,000 meters per hour to a bank of mercury vapor ultraviolet lights having a rated output of about 300 watts per centimeter. The resulting sheet material exhibited a well-adhered, flexible coated layer which was substantially impervious to aliphatic and aromatic solvents, yet was receptive to usual graphite and vinyl drafting pencil leads and aqueous-based drawing inks. The product further exhibited good erasing and redrawing qualities, and resistance to damage by handling. The reproduction of pencil and ink lines by diascopic processes, such as diazotype reproduction, was particularly acceptable.

EXAMPLE 2

A coating dispersion was prepared of the following composition.

|  | % |
| --- | --- |
| Trimethylolpropane triacrylate | 60 |
| Crystalline silica | 32 |
| RCP 5961B | 11 4 |
| Benzoin isobutyl ether | 4 |

This composition coated on a polyester base and cured in the manner described in Example 1 provided a suitable drafting film for pencil and ink.

The following exemplify additional compositions for a suitable drafting film product.

EXAMPLE 3

|  | % |
| --- | --- |
| Neopentylglycol diacrylate | 23 |
| 1,3 butyleneglycol diacrylate | 5 |
| Amorphous silica | 48 |
| Titanium dioxide | 2 |
| RCP 5961B | 16 |
| Benzoin isobutyl ether | 2 |
| Drying oil acrylate | 4 |

EXAMPLE 4

|  | % |
| --- | --- |
| Tetraethyleneglycol diacrylate | 36 |
| Amorphous silica | 42 |
| Titanium dioxide | 2 |
| RCP 5961B | 9 |
| Benzoin isobutyl ether | 2 |
| Semi-drying oil acrylate | 9 |

EXAMPLE 5

|  | % |
| --- | --- |
| Trimethylolpropane triacrylate | 53 |
| Crystalline silica | 35 |
| Titanium dioxide | 1 |
| RCP 611U (W. R. Grace & Co.) | 9 |

-continued

|  | % |
|---|---|
| Benzoin isobutyl ether | 2 |

EXAMPLE 6

|  | % |
|---|---|
| Trimethylolpropane triacrylate | 47 |
| RCP 611U | 9 |
| RCP 3961A (W. R. Grace & Co.) | 5 |
| Benzoin isobutyl ether | 2 |
| Crystalline Silica | 35 |
| Titanium dioxide | 2 |

What is claimed is:

1. Drafting sheet material comprising a sheet support having a coating thereon of a composition comprising finely-divided pigment dispersed throughout a binder matrix comprising a cross-polymerized reaction product of (a) an acrylic or methacrylic acid ester vinyl monomer and (b) a polyene/polythiol compound blend.

2. Drafting sheet material according to claim 1 wherein said cross-polymerized binder matrix further comprises an epoxidized drying oil acrylate.

3. Drafting sheet material according to claim 2 wherein said coated composition comprises about 30% to 50% silica pigment, about 5% to 20% polyene/polythiol blend, about 25% to 60% vinyl monomer, and up to about 10% epoxidized drying oil acrylate.

4. Drafting sheet material according to claim 3 wherein said coated composition further comprises up to about 5% of a benzoin ether photosensitizing compound.

5. Drafting sheet material according to claim 3 wherein said vinyl monomer selected from the class consisting of trimethylolpropane triacrylate, 1,3-butyleneglycol diacrylate, 1,6-hexanediol diacrylate, neopentylglycol diacrylate, tetraethylene glycol diacrylate, ethylacrylate, 2-ethylhexyl acrylate, trimethylolpropane trimethacrylate and pentaerythritol triacrylate.

6. The method of making a drafting sheet material which comprises applying to a sheet support a uniform coating of a fluid composition comprising about 30% to 50% finely-divided silica pigment, about 5% to 20% polyene/polythiol blend, about 25% to 60% vinyl monomer, and up to about 10% epoxidized drying oil acrylate; and exposing said coating to ultraviolet light for a time sufficient to solidify said fluid composition.

* * * * *